(12) United States Patent
Waits

(10) Patent No.: US 6,206,773 B1
(45) Date of Patent: Mar. 27, 2001

(54) CAROUSEL APPARATUS AND METHOD FOR EXPLOSIVE MEAT TENDERIZATION

(75) Inventor: Donald Waits, El Cerrito, CA (US)

(73) Assignee: Hydrodyne Incorporated, Sarasota, FL (US)

( * ) Notice: Subject to any disclaimer, the term of this patent is extended or adjusted under 35 U.S.C. 154(b) by 0 days.

(21) Appl. No.: 09/325,766

(22) Filed: Jun. 4, 1999

(51) Int. Cl.[7] .................................................. A22C 9/00
(52) U.S. Cl. ............................................. 452/141; 426/238
(58) Field of Search ....................... 452/141, 58; 426/238

(56) References Cited

U.S. PATENT DOCUMENTS

| | | | |
|---|---|---|---|
| 2,880,663 | * | 4/1959 | Simjian ................................ 452/141 |
| 3,492,688 | * | 2/1970 | Godfrey ................................ 452/141 |
| 3,711,896 | * | 1/1973 | Guberman et al. ................... 452/141 |

* cited by examiner

*Primary Examiner*—Willis Little
(74) *Attorney, Agent, or Firm*—Browdy and Neimark

(57) ABSTRACT

An apparatus for industrial tenderization of meat by the use of an explosive creating shock waves in water in a processor tank (300) which the meat is immersed. The processor tank includes an upper opening (313). A turntable or carousel (10) rotates to bring over the upper opening: an access hole (13) for loading and unloading the meat; a blast shield (100) to contain the explosion; and a water changer (200) for removing tainted water and adding fresh water. The water changer includes an upper cistern (250), fed by a water supply line (273), and a lower hollow basin (230). When the water changer is lowered into the processing tank by pneumatic cylinder (270), tainted water in flows through basin valves (233). Then the basin valves are closed, the water changer is lifted up, and the water is drained at another position. Before the water changer is raised, the processor tank is refilled with water stored in the cistern.

18 Claims, 3 Drawing Sheets

CAROUSEL APPARATUS AND METHOD FOR EXPLOSIVE MEAT TENDERIZATION

FIELD OF THE INVENTION

The present invention relates to structures and methods for treating meat or other food or non-food products using explosive energy from a chemical or electrical explosion, especially for tenderizing meat and/or killing bacteria in or on the meat.

BACKGROUND OF THE INVENTION

The following U.S. patents are directed to meat treatment using a shock wave caused by an explosive discharge: U.S. Pat. No. 5,273,766; U.S. Pat. No. 5,328,403; and U.S. Pat. No. 5,841,056. Each of the above-listed patents and patent applications is entirely incorporated herein by reference.

The explosive process for meat treatment, called the Hydrodyne System, has received much attention with respect to its ability to tenderize tough cuts of meat in an effective and efficient manner without degrading the quality of the meat as occurs with chemical tenderizer, as well as its potential to kill bacteria and increase public health. Since the meat is already sealed in plastic when exposed to the explosion's shock wave, the effect is somewhat like pasteurization.

In addition, the process is rapid. Meat is tenderized in seconds instead of weeks.

The above-listed patents and certain pending applications describe embodiments in which the meat is first lined along the bottom of a water-filled, hemispherical stainless steel explosion-containing chamber called a "processor tank" or "hemishell", how an explosion is created at the center point, how the explosive force pushing down the stainless steel processor tank is absorbed, how the energy of the plume of water and steam rushing upward after the explosion is deflected or absorbed by a shield, and so on. The above-listed patents are directed mainly to the particular structures and methods used in one cycle of explosive tenderizing.

However, they do not adequately address the speed of the operation, which is important in commercial applications of explosive meat treatment. The explosion itself is of course very brief, but long periods of time have been needed to load the processor tank with meat, fill it with water, clear the area of personnel prior to a chemically detonated explosion, remove the meat, and refill the processor tank with water after the explosion.

In addition, it has been found that complete replacement of the water is preferable, and this has not been addressed. The reason why the water should be changed is that the preferred chemical explosives are molecular explosives, which are deficient in oxygen. Due to this oxygen deficiency, the oxygen which is freed during the explosion combines with hydrogen and nitrogen in preference to carbon, and carbon soot is left behind in the water as an explosion by-product. This soot will accumulate, gradually darkening any water which is re-used. In addition, traces of HCN are left behind in the water. Though the HCN is so dilute as to present no health risk, and there is no need to see into the water, it is preferable in order to alleviate any public concerns for fresh or cleaned water to be used after only one or a few explosions, in which case the water is desirably completely changed periodically. This problem has not previously been addressed, nor has the problem of doing so quickly.

SUMMARY OF THE INVENTION

An object of the present invention is to successfully address the above problems, among others.

Another object is to provide an improved automated system for treating meat.

The present invention preferably uses the structures and methods already described in the related applications or patents (it can also use other structures and methods) but arranges them to increase the speed and automation of meat processing. In doing so, the present invention can tenderize several hundred pounds of meat per minute.

A main concern when using explosives is safety. Therefore, the present invention is intended for fully automatic or remote-controlled operation within a blast-proof enclosure or room.

In the present invention the required steps of: loading the meat; filling the processor tank with water; placing and detonating a chemical charge; removing the meat; and (preferably) completely removing the old water; are all carried out desirably with the use of a turntable platform, or carousel, with three stations. A first station is for loading and unloading meat. A second station is for changing the water. A third station is for containing the actual explosion. As the carousel rotates, each station is brought in its turn to a position directly over the processor tank. The carousel is preferably at floor level so that service personnel can walk onto the carousel surface easily.

For loading (and later, unloading) meat, the carousel has a preferably round access hole through which a basket, preloaded with meat, can be lowered. The baskets are brought into the explosion room on, e.g., an overhead trolley and lowered by remote or automatic control through the hole into the processor tank, which has previously been filled with fresh water.

The carousel is then rotated so that the explosion shield or "processor dome" is in position over the processor tank. The shield is lowered down and locked onto the rim of the processor tank. The explosive charge is then generated using either a chemical explosive or electrical discharge, thus, tenderizing the meat, and then the shield is unlocked and raised.

The carousel rotates again, bringing the hole over the processor tank, and the meat is removed.

Finally, a water-changing unit is brought over the explosion by revolving the carousel through the appropriate angle, and the water is removed and replenished.

To replace the water most rapidly, the present invention preferably employs a two-stage water changer. The upper stage is a cistern for storing fresh water and the lower stage is a basin which is shaped like the inside of the stainless steel explosion chamber or processor tank. The processor tank is preferably shaped as a hemisphere connected on its equator to a cylindrical upward extension, and the lower-stage basin preferably mates closely with this shape so that when it is lowered into processor tank only a small amount of water will be left between the outside of the basin and the inside of the processor tank.

However, the basin does not displace the water in the processor tank. Instead, the bottom of the basin includes a valve or valves which are opened while the water changer unit is lowered into the processor tank, so that the soot-containing water following the chemical explosion flows through the valve into the basin. Then the valve is closed so that, when the water changer is again raised, the soot-containing water is lifted out.

Before the water changer is lifted out, the small amount of water between the basin and processor tank is preferably flushed out. For this purpose, a large central pipe preferably runs from the bottom of the basin, up through the basin interior, to the cistern. After the basin valve is closed, a second valve coupling the cistern to the central pipe is opened and water flows from the high cistern, propelled by hydrostatic pressure, through the bottom of the cistern and up between the basin and the inside of the processor tank. The water changer is raised up, preferably just after flushing begins, to create a space between the cistern and tank, which the clean water draining from the cistern can occupy. The water stops overflowing the sides of the processor tank, and by the time the water changer is raised up above the carousel deck the processor tank is ready for the next load of meat and the next explosive charge.

BRIEF DESCRIPTION OF THE DRAWING

The above and other objects and the nature and advantages of the present invention will become more apparent from the following detailed description of an embodiment taken in conjunction with drawings, wherein.

DETAILED DESCRIPTION OF THE PREFERRED EMBODIMENT

Here, and in the following claims, "carousel" means a turntable, or more especially a turntable with devices mounted on it.

Figure 1:
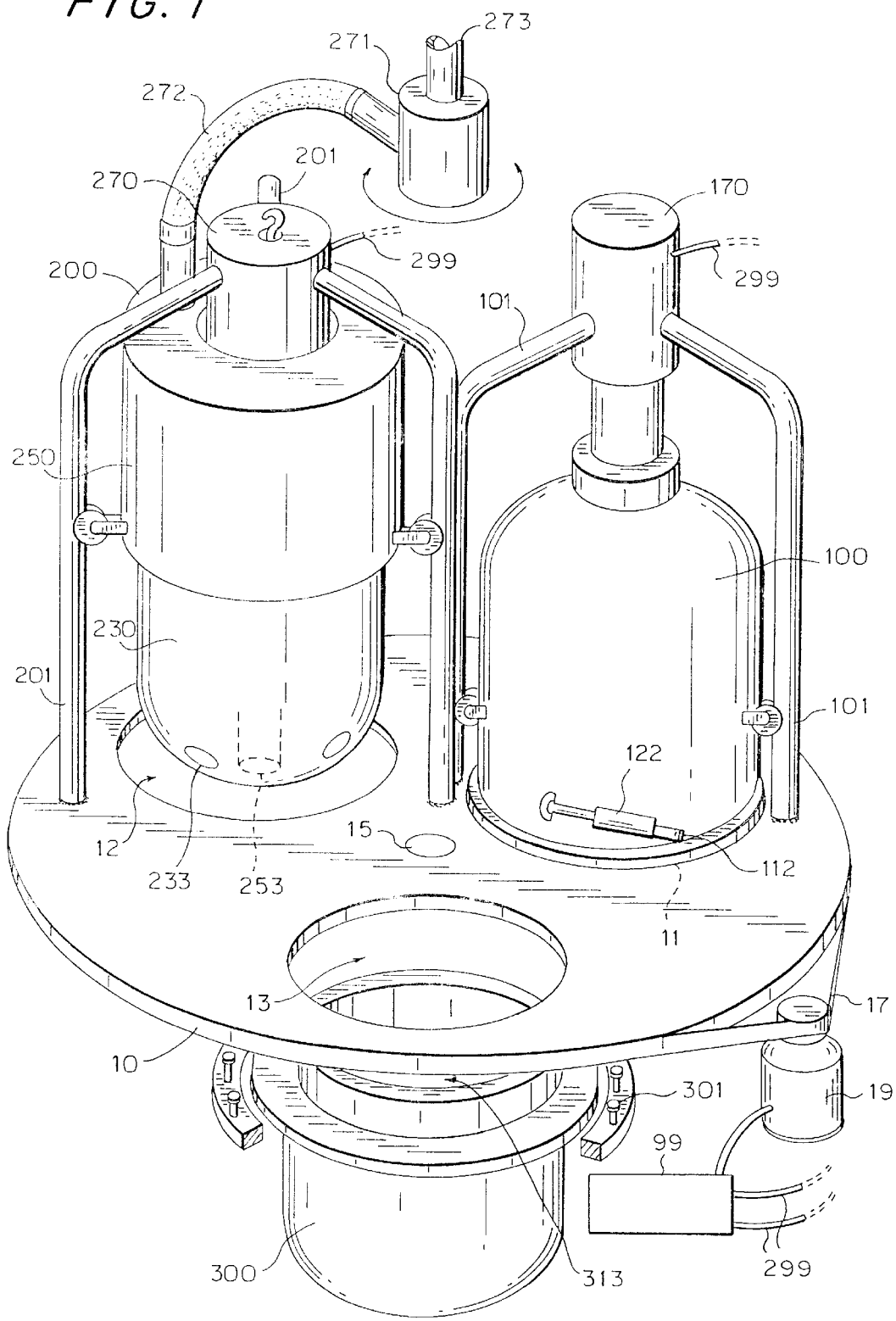
FIG. 1 is a perspective view of a rotatable platform according to the present invention.

FIG. 1 shows the main parts of a device according to the present invention, a system for explosive tenderization of meat (or other food products) via shock waves in a fluid, preferably fresh water, in which the meat is immersed. The shock waves instantly tenderize the meat.

The meat is placed in a processor tank 300 having an upper opening 313, through which the meat is lowered to line the hemispherical lower portion of the processor tank 300. An explosive chemical charge (not shown in FIG. 1) is placed at the center of the hemispherical portion, visible at the bottom of FIG. 1, so that the shock waves reach the meat lining the hemispherical portion with uniform intensity. FIG. 1 shows the present invention in a configuration in which the meat may be loaded into the upper opening 313 by way of an access hole 13 (about three feet in diameter) through the floor of a platform, turntable, or carousel 10, which is preferably round.

In the preferred embodiment of FIG. 1 the processor tank 300 and the upper opening 313 are stationary, and the carousel 10 allows sequential positioning of three features or devices over the upper opening 313 for the different steps of meat tenderizing: an access hole 13 for loading and unloading the meat; an explosion shield or blast shield 100 which contains the explosion; and a water changer 200 which refreshes the water in the processor tank 300. All three are laterally movable over the upper opening 313 by rotating the carousel 10. Beneath the water changer 200 the carousel 10 has a hole 12 and the blast shield 100 has a corresponding hole 11 beneath it. The water changer is also movable vertically, as explained below. The blast shield 100 preferably locks onto the upper opening 313, and is vertically movable over a limited range for this purpose.

The carousel 10 rotates about a central bearing 15 or some equivalent rotational support. A floor (not shown) preferably is continuous with the round edge of the carousel 10 so that people can walk around the apparatus for servicing. For safety, the access hole 13 preferably includes a stanchion or guard rail (not shown) to prevent personnel from falling into the processor tank in case of accident or carelessness. A mechanism for rotating the carousel 10 to various positions is in the preferred embodiment a drive belt 17 coupled to a motor 19 (e.g., a step motor) controlled by a controller 99. Preferably position sensors are also provided to ascertain the angular position of the carousel 10 independently of the motor 19 motions. The carousel may rotate completely around or it may rotate back and forth through an angle of, e.g., 240°.

The blast shield 100 is supported on a tripod with legs 101, preferably of steel tubing, running up from the surface of the carousel 10. The legs 101 meet at a pneumatic cylinder 170 which raises and lowers the blast shield 100. (Only two tripod legs are visible in FIG. 1; the third is hidden by the cylinder 170 and blast shield 100.) When lowered, the blast shield locks onto the processor tank 300. A locking ring 112 has recesses 103 (seen in FIG. 3) engaging studs 301 spaced around the rim of an outer container (not shown fully) in which the processor tank 300 rests. A cylinder 122 rotates the blast shield 100 slightly to lock the locking ring 112 onto the studs 301. The locking mechanism is better shown in FIG. 3 and is explained below.

After the explosion, some water remains inside the processor tank. This spent water is slightly contaminated by explosion by-products as discussed above. The spent water is removed by the water changer 200 and replaced with fresh water. The spent water may be discarded or may be filtered and re-used.

Figure 2:
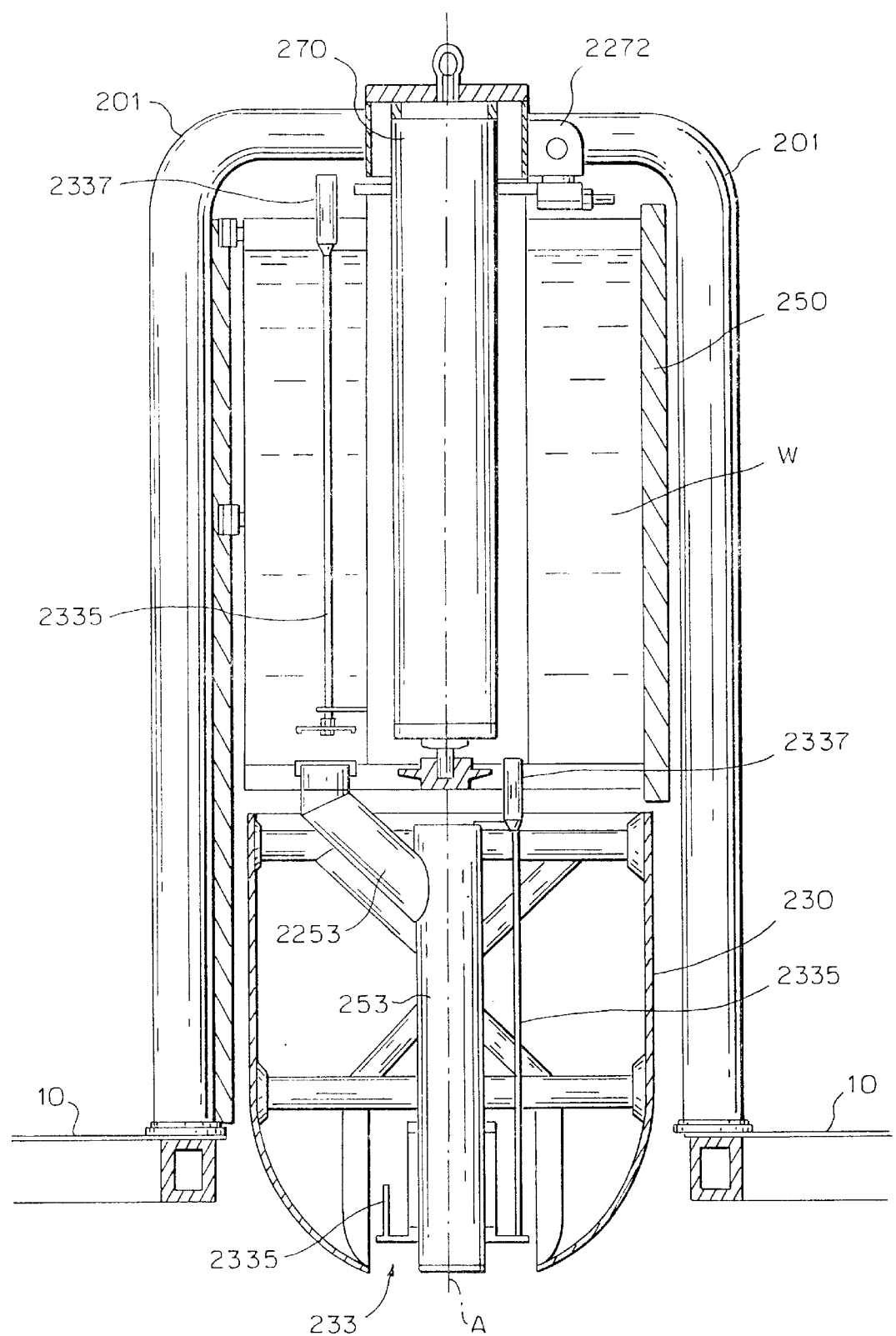
FIG. 2 is a cross-sectional view of the water changer shown in FIG. 1, taken on a vertical plane in which lies the cylindrical axis A of the water changer.

The internal structure of the water changer 200 is shown in FIG. 2, and is further explained below. A basin 230, shaped like the inside of the processor tank, can fit snugly inside the processor tank. FIG. 1 shows several distinct valves basin 233 disposed near the bottom of the basin 230; in FIG. 2 a single annular valve is shown. Whatever their form, the valve or valves 233 let water flow from the processor tank 300 into the basin 230 as the water changer 200 is lowered down by an elevator unit 270 containing an air cylinder which is braced on tripod legs 201.

When the water changer 200 is fully lowered the basin 230 is fully immersed in the processor tank 300, so that only a thin layer of water remains between the outside of the basin 230 and the inside of the processor tank 300; almost all of the spent water is inside the basin.

After the basin 230 is fully lowered, the basin valves 233 are closed to seal the spent water inside the basin 230. Before the elevator unit 270 begins to raise the water changer 20, the small amount of water between the basin 230 and processor tank 300 is preferably flushed out by water from the cistern 250 which is above the basin 230. A central delivery pipe 253, which is internally connected to the cistern 250 via a valve, terminates at the lower-most central part of the basin. Water is allowed to begin flowing through this delivery pipe 253 after the basin valves 233 are closed, which flushes out the remaining spent water.

The water changer 200 is preferably raised by the elevator unit 270 while water from the cistern 250 continues to flow through the delivery pipe 253. Thus, the processor tank 300 is refilled with fresh water from the cistern 250 while the water changer 250 is being raised. This saves time and shortens the tenderization cycle. By the time the cistern is fully raised it is also substantially emptied into the processor tank, and the flow through the delivery pipe 253 is cut off.

The pneumatic cylinder of the elevator unit 270 and the water valves are preferably activated by the controller 99 through control line 299. When the water changer 200 is back in the position shown in FIG. 1, the basin valves 233 are opened and the spent water flows down a drain below.

Once the water changer 200 is raised and the flow of water is cut off, the carousel 10 can rotate to bring the access hole 13 over the processor tank 300, allowing the meat and explosive to be put in place. Then the carousel 10 is rotated again so that the blast shield 100 can be locked onto the top rim of the processor tank by means of the locking mechanism and cylinder 122, as is better explained below.

The cistern preferably contains about 440 gallons of water. Such a large quantity of water cannot be supplied to the cistern, at one shot, by ordinary plumbing. The present invention preferably includes a water supply pipe 272 coupled to the elevator unit 270, which in turn is fastened to a rotatable coupling 271 fed by an overhead water supply line 273. The supply line 273, which does not rotate, is preferably disposed directly over the axis of rotation (bearing 15) of the carousel, so that there is no strain on the supply pipe 272 and rotatable coupling 271 as the carousel 10 rotates. The flow of water from the supply line 273 into the cistern 250 is essentially continuous.

In the carousel position shown in FIG. 1 the basin 230 may be emptied through the hole 12 by opening internal valves, to drain the spent water into a sink drain (not shown) below.

Thus, by rotating the carousel 10 and coordinating the actions of the motor 19 and the various hydraulic and pneumatic cylinders and valves with the controller 99, the present invention provides for rapid and automatic cyclical explosive tenderization of meat or other food products.

The water changing functions of depleting the old water and replenishing with new water can of course be performed by totally distinct water changers, one for draining and one for filling. However, the illustrated combined water depletor/water replenisher is preferred because it avoids moving the carousel to a fourth position, which would require additional time. The invention also contemplates a water changer without a reservoir or other water storage, for example a large-diameter water supply line with a valve. With proper timing, one large supply line could supply several tenderization units in sequence. That is, the flow could be switched from one processor tank to the next, with the switches timed at a certain interval after the corresponding explosions.

FIG. 2 shows the internal structure of the water changer in more detail. The structure is generally cylindrical, with an axis A; the water-holding cistern 250 is shaped as an annulus of a cylinder, with the actuator or elevator unit 270 in the middle, and the hollow basin 230 is roughly bullet-shaped. As discussed above, the valve 233 is annular and surrounds the delivery pipe 253. The annular valve 233 is actuated via a pushrod 2335 worked by a pneumatic cylinder 2337 under the control of the controller 99. A portion of a second pushrod 2335 is visible on the other side; for clarity, the entire rod is not shown. Two or more cylinders and pushrods provide balanced force to avoid binding.

The delivery pipe 253 is coupled to the cistern 250 via a feed pipe 2253, the upper end of which is closable via a valve mounted at the bottom of a pushrod 2335, actuated by cylinder 2337, also remotely worked by the controller 99, preferably through electrical operation of pneumatic valves.

A connection 2272 couples to the supply pipe 272. The cistern holds water W.

Cylinder 270, which is fastened at its upper end to the tripod legs 201, moves the structure up and down, also as directed by the controller 99, by its attachment to the bottom of the cistern 250.

Figure 3:
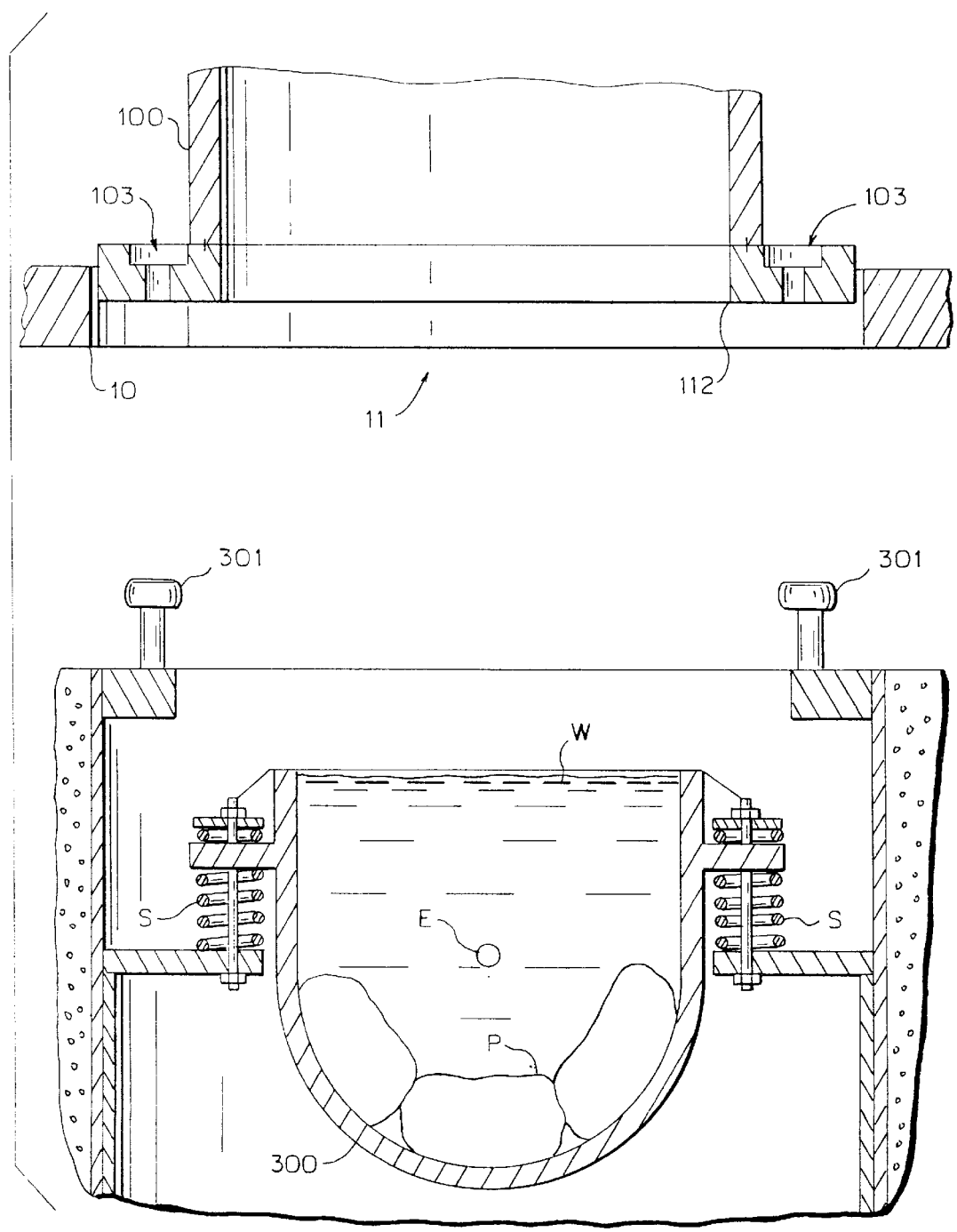
FIG. 3 is a cross-sectional view of the processor tank and a portion of the blast shield.

FIG. 3 shows the processor tank 300 full of water W and food product P, and holding an explosive charge E. The tank 300 rests on shock absorbers S. The studs 301, which are also visible in FIG. 1, slide into recesses 103 when the blast shield 100 is lowered by the cylinder 170. As is visible in the cross-sectional view of the recesses 103 in FIG. 3, each recess 103 includes a large bore (seen on the right-hand side of FIG. 3) through which the enlarged heads of the studs 301 can pass, and adjacent each large bore is a smaller channel (seen on the left-hand side of FIG. 3) with an enlarged head space above it, into which the enlarged head of the stud 301 fits while the narrower shaft of each stud 301 fits into the narrow channel; this is the locked position.

With the blast shield 100 lowered and the studs 301 passed through the large bore, the locking ring 112 is rotated by the cylinder 122 (seen in FIG. 1) which causes the locking ring 112 to rotate relative to the blast shield 100, so that in FIG. 3 the right-hand portion moves out of the plane of the paper and the left-hand portion moves into the plane of the paper. This causes the shafts of the studs 301 to pass into the narrow channels and the stud heads to fit into the head space above each channel, to hold the locking ring and blast shield 100 in position.

Other configurations of the present invention are possible. One example is a translating, rather than a rotating, platform. In such an arrangement the shield dome and water-changer, mounted on a slide or slide units, would shuttle back and forth.

In an alternative embodiment the water changer 200 and the blast shield 100 may be arranged differently but still such that they are laterally movable to be positioned selectively over the processor's upper opening 313. For example, they may be mounted on a translating table (not shown) with a central access hole in the middle and the shield and changer on either end; the translating table would slide to an fro.

The present invention also contemplates the explosion-containing tanks being movable beneath fixed explosion domes and water changers.

A valve is preferably not used to drain the sooty water from the processor tank 300 after the explosion because of mechanical constraints. A valve would weaken the processor tank by removing a section at the bottom, and the valve would need to be extremely rugged to withstand repeated explosions. However, a processor tank with a bottom (or side) valve or valves is within the scope of the present invention. The sealing element of such a valve should be very massive so that its inertia would keep it in position while a shock wave hit and reflected from its surface.

Other fluids than water can be used to transmit the explosive shock wave from the explosive discharge caused by a chemical explosive or electrical discharge to the food product. Shock waves in a gas, such as air are within the scope of the present invention.

The industrial applicability involves meat treatment and explosive containment. The problem solved by the invention is slow processing times in explosive treatment of meat.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. The means and materials for carrying out various disclosed functions may take a variety of alternative forms without departing from the invention.

Thus the expressions "means to . . . " and "means for . . . " as may be found in the specification above and/or in the claims below, followed by a functional statement, are intended to define and cover whatever structural, physical, chemical or electrical element or structure may now or in the future exist which carries out the recited function, whether or not precisely equivalent to the embodiment or embodiments disclosed in the specification above; and it is intended that such expressions be given their broadest interpretation.

What is claimed is:

1. For explosive treatment of food products by the use of an explosive device creating shock waves in a fluid in which the food products are immersed, a system comprising:
    a processor tank wherein the food product is to be treated, the processor tank including an opening for accepting the food product therein;
    a blast shield movable over the opening and away from the opening; and
    a fluid changer movable over the opening and away from the opening.

2. The system according to claim 1, wherein the opening is an upper opening and wherein the blast shield and the fluid changer are laterally movable over and away from the upper opening.

3. The system according to claim 2, wherein the fluid changer is vertically movable into and out of the upper opening when disposed over the upper opening.

4. The system according to claim 3, wherein the fluid changer includes a hollow basin substantially mating with an interior of the processor tank, the basin including a basin valve for admitting the fluid from the processor tank into the basin.

5. The system according to claim 3, wherein the fluid changer includes a cistern holding the fluid and a fluid delivery pipe coupling the cistern and the processor tank when the fluid changer is moved into the upper opening.

6. The system according to claim 2, comprising a movable platform on which the fluid changer and the blast shield are laterally mounted for lateral motion.

7. The system according to claim 2, wherein the blast shield is lockable against upward motion.

8. The system according to claim 2, wherein the blast shield is vertically movable toward and away from the upper opening when disposed over the upper opening.

9. The system according to claim 6, wherein the movable platform comprises a turntable and the fluid changer and the blast shield are mounted on the turntable.

10. The system according to claim 9, wherein the turntable includes an access hole extending therethrough.

11. The system according to claim 6, wherein the movable platform includes an access hole extending therethrough.

12. The system according to claim 1, comprising a central control system operating the fluid changer and the blast shield.

13. A liquid changer comprising
    a hollow basin including a basin valve at a lower end thereof for admitting liquid into the basin;
    a cistern disposed above the basin and fixed thereto;
    a liquid delivery pipe coupling the cistern to the lower end of the basin; and
    a cistern valve between the cistern and the lower end of the basin for controlling a flow, of liquid from the cistern through the delivery pipe.

14. The liquid changer according to claim 13, comprising an actuator for raising and lowering the basin from an upper support.

15. The liquid changer according to claim 14, wherein the actuator comprises a pneumatic cylinder.

16. The liquid changer according to claim 14, wherein the upper support comprises a tripod.

17. The liquid changer according to claim 13, comprising at least one feed pipe coupling the cistern to the delivery pipe.

18. The liquid changer according to claim 17, wherein the cistern is shaped as an annulus of a cylinder, the delivery pipe extends axially, and the feed pipe is inclined generally from the bottom of the annulus to the delivery pipe.

* * * * *